United States Patent [19]

Smazik et al.

[11] Patent Number: 4,757,919

[45] Date of Patent: Jul. 19, 1988

[54] SHUT-OFF VALVE FOR JUICE DISPENSING SYSTEM

[75] Inventors: Kenneth G. Smazik, Marietta; E. Scott Smith, Jonesboro; James B. Watson, Lithonia, all of Ga.

[73] Assignee: The Coca-Cola Company, Atlanta, Ga.

[21] Appl. No.: 910,542

[22] Filed: Sep. 23, 1986

[51] Int. Cl.[4] .......................... B67D 5/60; F16L 29/00

[52] U.S. Cl. .................................... 222/145; 222/518; 251/149.6

[58] Field of Search .............. 137/565, 614.03, 615.05; 251/149.4, 149.6; 222/105, 372, 400.7, 400.8, 505, 507, 511, 513-514, 523, 129.1-129.4, 135-136, 145

[56] References Cited

U.S. PATENT DOCUMENTS

| | | | |
|---|---|---|---|
| 580,375 | 4/1897 | Clark | 222/514 |
| 1,990,262 | 2/1935 | Bailey | 222/514 |
| 2,028,175 | 1/1936 | Waite | 221/60 |
| 2,112,125 | 3/1938 | Von Bültzingslöwen | 221/60 |
| 2,536,428 | 1/1951 | Dimitri et al. | 251/149.4 X |
| 2,753,195 | 7/1956 | Palmer | 284/18 |
| 4,366,816 | 1/1983 | Bayard et al. | 128/213 |
| 4,445,539 | 5/1984 | Credle | 137/614.03 |
| 4,510,969 | 4/1985 | Rodth | 137/614.05 |
| 4,606,476 | 8/1986 | Pocock et al. | 222/148 |

FOREIGN PATENT DOCUMENTS

| | | | |
|---|---|---|---|
| 1190757 | 10/1959 | France | 222/514 |

*Primary Examiner*—Michael S. Huppert
*Attorney, Agent, or Firm*—Thomas R. Boston

[57] ABSTRACT

A juice dispensing system for dispensing pulp-containing juice from a container to a dispensing valve. The end of the juice conduit that connects to the juice container includes a shut-off valve connector. The shut-off valve connector includes a housing having a chamber therein, a sleeve is mounted in the chamber for back and forth movement therein between open and closed positions, the sleeve has a juice passageway therethrough, a spring is located in the chamber for biasing the sleeve to its closed position, and a coupling member is connected to the housing for coupling the-shut-off valve connector to a spout of the juice container, which causes the sleeve to move to its open position providing fluid communication from the juice container to the dispensing valve. The valve connector is simple and inexpensive and free of any obstructions or areas which can trap pulp.

5 Claims, 3 Drawing Sheets

SHUT-OFF VALVE FOR JUICE DISPENSING SYSTEM

BACKGROUND OF THE INVENTION

1. Field of the Invention

This invention relates to postmix juice dispensing and in particular to a shut-off valve connector for a juice dispensing system for pulp-containing juice.

2. Description of the Prior Art

Postmix orange juice dispensing systems are known in which thawed juice concentrate is mixed with water in a desired ratio to produce the juice beverage. The juice may or may not contain pulp. The present system is similar to milk dispensing systems which use dairy bags for the milk and a gravity feed system with a simple shut-off valve that is actuated by pushing a beverage cup against a lever arm. When the prior art dairy bag is empty, it is simply replaced with a new bag. The use of juice containing pulp causes many problems because the pulp clogs valves and lines.

It is an object of the present invention to dispense viscous juice containing pulp from a container.

It is another object of the present invention to provide a shut-off valve connector on the end of the juice concentrate line to be attached to a container of viscous, pulp-containing juice.

It is a still further object of this invention to provide a shut-off valve connector for pulp-containing juice that will not clog up.

It is another object of this invention to pump viscous, pulp-containing juice concentrate from a container, without spilling concentrate when switching bags.

SUMMARY OF THE INVENTION

A juice dispensing system for dispensing pulp-containing, viscous juice concentrate, using a container, such as a bag-in-box, for the juice concentrate and using a non-clogging shut-off valve connector on the end of the juice concentrate conduit that connects a concentrate moving means, such as a pump, to the concentrate container. The shut-off valve connector includes a housing with a chamber therein, a piston sleeve mounted in the chamber for back and forth movement between valve-open and valve-closed positions, the piston sleeve having a juice passageway therethrough, a spring in the chamber for biasing the sleeve to its closed position, and a coupling member connected to the housing for attaching the valve connector to a spout of a juice container. The spout engages the sleeve upon attachment and forces the sleeve, against the spring force, to its open position. When the valve connector is removed from an empty container, the valve connector closes, keeping juice concentrate from spilling out of the line.

BRIEF DESCRIPTION OF THE DRAWINGS

The present invention will be more fully understood from the detailed description below when read in connection with the accompanying drawings wherein like reference numerals refer to like elements and wherein.

DETAILED DESCRIPTION OF THE PREFERRED EMBODIMENT

Figure 1:
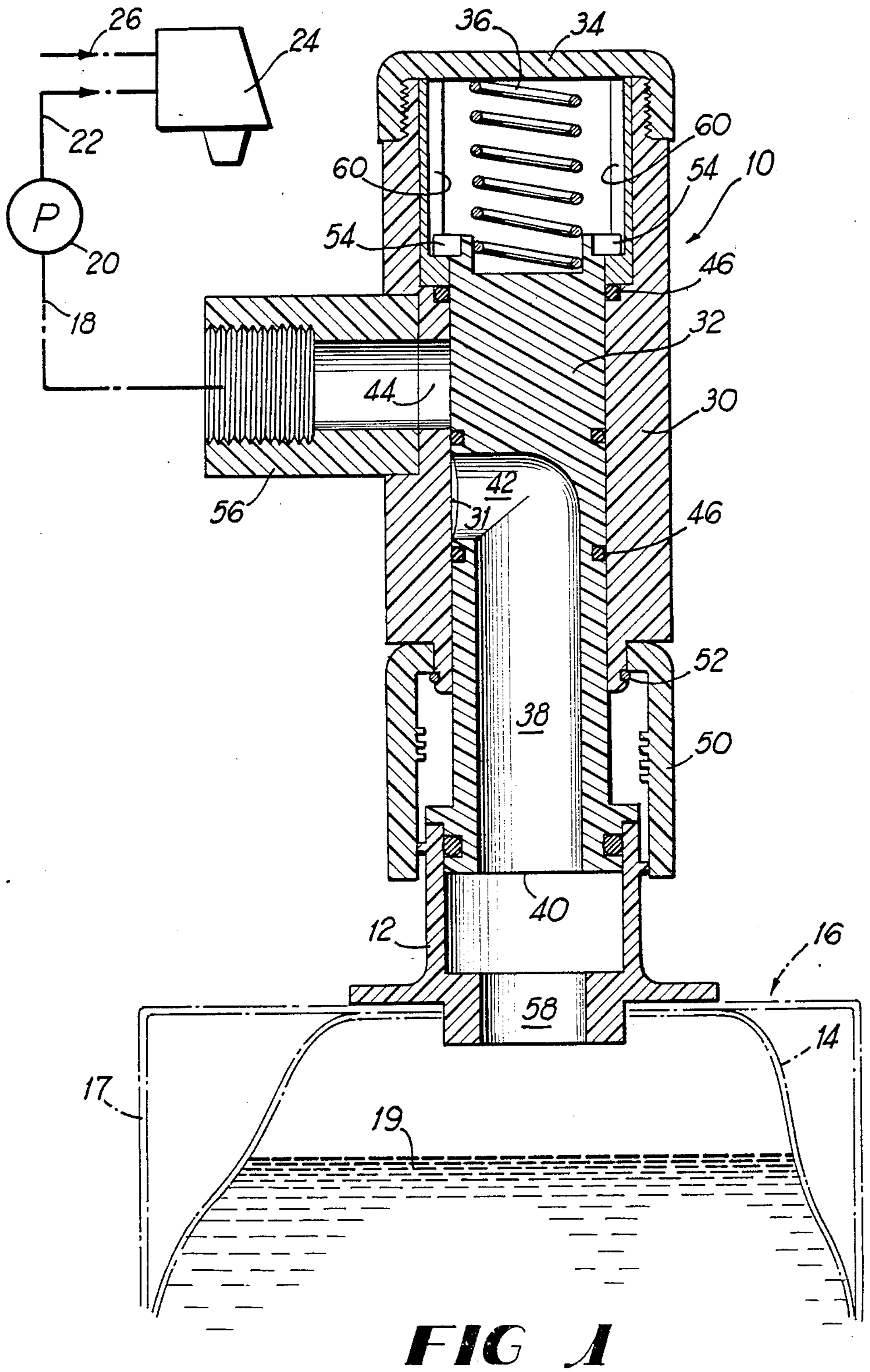
FIG. 1 is a partly diagrammatic illustration of the dispensing system of this invention and a cross-sectional side view through the shut-off valve connector, in its closed orientation, according to the preferred embodiment of the present invention.
Figure 2:
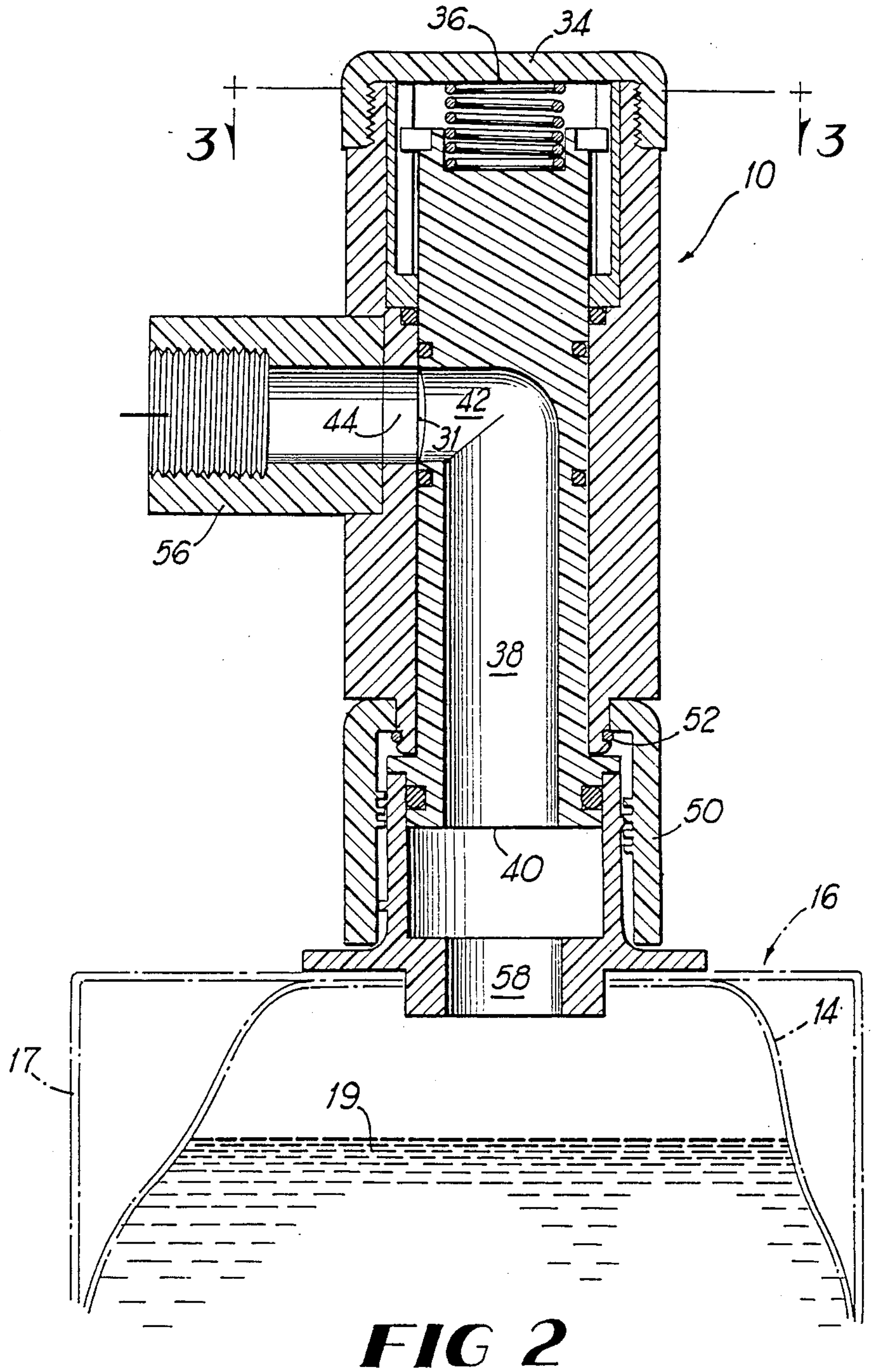
FIG. 2 is a cross-sectional side view of the valve connector shown in FIG. 1 but shown in its open orientation.
Figure 3:
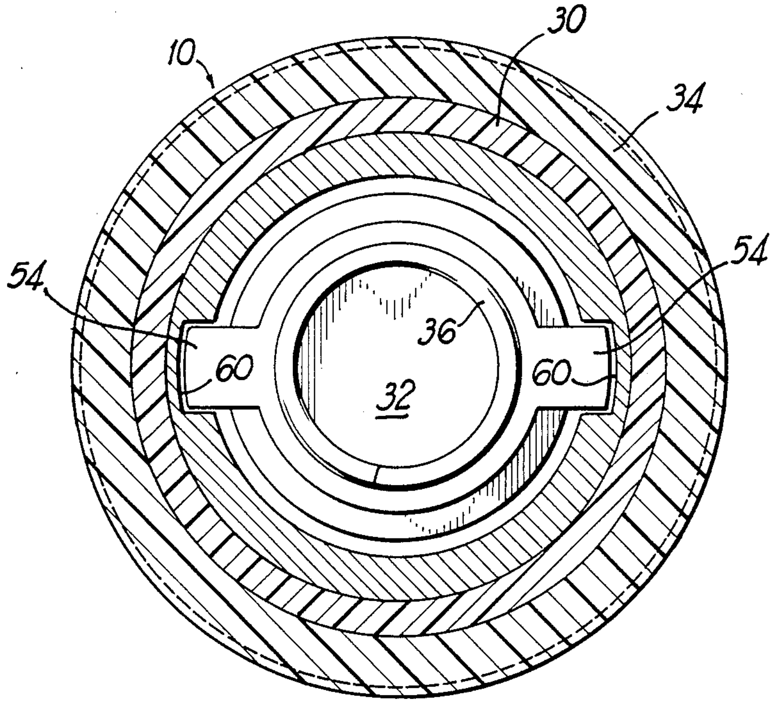
FIG. 3 is a cross-sectional view taken along line 3—3 of FIG. 2.

With reference now to the drawings, FIGS. 1–3 show an orange juice shut-off valve connector 10 according to the preferred embodiment of the present invention, connected to the end of an orange juice concentrate conduit 18. The valve connector 10 is to be connected to the spout 12 of a bag 14 used in a bag-in-box container system 16 including a paperboard box 17. The bag 14 contains orange juice concentrate 19. The valve connector 10 is connected by the conduit 18 to a pump 20 which pulls the concentrate from the bag 14 and forces it through a conduit 22 to a dispensing valve 24 where it is mixed in the desired ratio with a diluent such as water, fed to the dispensing valve 24 through a conduit 26.

The shut-off valve connector 10 includes a housing 30 having a cylindrical chamber 31 therein for accommodating an axially movable sleeve 32 therein. A cap 34 is screwthreadedly connected to the distal end of the housing 30 and a coil compression spring 36 is positioned within the housing between the cap 34 and the sleeve 32 for biasing the sleeve downwardly to a closed position as shown in FIG. 1. The sleeve 32 has a concentrate passageway 38 therethrough from an inlet opening 40 to an outlet opening 42. The sidewall of the housing 30 includes an outlet port 44 that mates with the outlet opening 42 of the sleeve 32 when the sleeve is in its uppermost or open position shown in FIG. 2. A number of O-rings 46 provide a seal between the axially movable sleeve and the housing.

The valve connector 10 also includes a coupling 50 for use in attaching the valve connector 10 to the existing spout 12 or other fitting of the orange juice bag 14. A retainer 52 connected to the housing 30 allows the coupling 50 to rotate, while maintaining it affixed to the housing. The coupling is internally screwthreaded to mate with external screw threads on the spout 12. The lower end of the sleeve has an O-ring that seals against the inside wall of the spout when the valve connector 10 is connected to the spout.

The upper or distal end of the sleeve has a shoulder 54 to limit the downward travel of the sleeve in its closed orientation shown in FIG. 1. The housing preferably has an integral fitting 56 that mates with the outlet port 44 for connecting the valve connector 10 to the conduit 18.

The diameter of the passageway 38 is preferably just under one-half inch. Prior to connecting the valve connector 10 to the spout 12, the bag 14 would have a cap or lid (not shown) screw threaded onto the spout. To keep the outlet opening 42 in registry with the outlet port 44, the housing and sleeve are provided with a key and slot system 60.

In operation, the valve connector 10 is attached to the spout 12 of the concentrate bag 14 by screwing the coupling 50 onto the spout. As the coupling is threaded down onto the spout, the spout contacts the proximal end of the sleeve 32 and pushes it upwardly against the force of the spring 36 to the final position shown in FIG. 2, providing communication between the passageway 38 and the outlet port 44 of the housing 30, so that orange juice concentrate in the bag 14 can flow out of the bag 14 to the pump 20 by the suction created by the pump. The pump then pushes the concentrate to the dispensing valve 24.

The passageway 38 is free from any obstruction or areas which may trap pulp in the orange juice concentrate, and is preferably of smooth, uniform, circular cross-section, identical in size and shape to the passageway 58 in the spout 12.

While the preferred embodiment of this invention has been described above in detail, it is to be understood that variations and modifications can be made therein without the departing from the spirit and scope of the present invention as set forth in the appended claims. Most of the parts of the valve connector 10, except the spring, are preferably made of plastic. While the valve connector 10 was designed for use in a postmix dispensing system; it can also be used in a premix juice dispensing system. The valve connector 10 can also be used in other postmix juice dispensing systems than the preferred system described above, that is, it is not limited to use with a pump as the means for moving the concentrate through the concentrate conduit, nor to use with thawed concentrate since it can also be used with unthawed 5+1 concentrate at −10° F. to 0° F., for example. Alternatively to feeding the juice concentrate to a dispensing valve 24, it can also be fed to a reservoir of a gravity fed juice dispensing system, having for example, a float controlled automatic filling arrangement.

We claim:

1. A shut-off valve connector for a juice dispensing conduit comprising:

(a) a housing enclosing an elongated chamber therein, said housing having an inlet opening into said chamber in a proximal end of said housing, and having an outlet port in a sidewall of said housing in communication with said chamber;

(b) a sleeve located in said chamber for reciprocating movement therein between a closed position and an open position;

(c) said sleeve having a passageway therethrough including an inlet opening in a proximal end thereof in fluid communication with said inlet opening of said housing, and an outlet opening in a side thereof mating with said outlet port when said sleeve is in said open position;

(d) means for biasing said sleeve into its closed position;

(e) a coupling connected to the proximal end of said valve connector housing for attaching said valve connector to a container spout, whereby upon such attachment said sleeve will be forced to move, relative to said housing, to said open position;

(f) said sleeve passageway having a smooth interior surface and having a substantially uniform circular cross-section along its entire length, said passageway including a smoothly curving 90° bend therein; and (g) a fitting connected to said housing surrounding said outlet port of said housing and having a fitting passageway therethrough identical to that of said sleeve passageway.

2. The valve connector as recited in claim 1 wherein said biasing means is a coil compression spring positioned in said chamber between a distal end of said sleeve and a distal end of said housing.

3. The valve connector as recited in claim 1 in combination with an orange juice container having a spout adapted to couple to said valve connector and to contact said sleeve when said valve connector is coupled thereto, for opening said valve connector.

4. The valve connector as recited in claim 3 wherein said spout has a juice passageway therethrough identical in cross-sectional size and shape to that of said sleeve passageway, to prevent any pulp in the juice from clogging said passageway.

5. Apparatus for dispensing pulp-containing juice comprising:

(a) a dispensing valve for mixing juice and water, and including a water conduit connected thereto and a juice conduit connected at one end thereof to said dispensing valve;

(b) means for forcing juice through said juice conduit;

(c) a shut-off valve connector connected to the other end of said juice conduit;

(d) a container for juice concentrate and including a spout having a juice passageway therethrough; and (e) said shut-off valve connector having a juice passageway therethrough identical in cross-sectional size and shape to that of said spout, to prevent clogging by pulp;

(f) said shut-off valve connector comprising:

i. a housing having an elongated chamber therein, said housing having an inlet opening into said chamber in a proximal end of said housing, and having an outlet port in a sidewall of said housing in communication with said chamber;

ii. a sleeve located in said chamber for reciprocating movement therein between a closed position and an open position;

iii. said sleeve having a passageway therethrough including an inlet opening in a proximal end thereof in fluid communication with said inlet opening of said housing, and an outlet opening in a side thereof mating with said outlet port when said sleeve is in said open position;

iv. means for biasing said sleeve into its closed position;

v. a coupling connected to the proximal end of said valve connector housing for attaching said valve connector to said bag spout, whereby upon such attachment said sleeve will be forced to move, relative to said housing, to said open position;

vi. said sleeve passageway having a smooth interior surface and having a substantially uniform circular cross-section along its entire length, said passageway including a smoothly curving 90° bend therein; and vii. a fitting connected to said housing surrounding said outlet port of said housing and having a fitting passageway therethrough identical to that of said sleeve passageway.

* * * * *